S. W. BUERCKLIN.
SPRING CUSHIONED WHEEL.
APPLICATION FILED DEC. 7, 1911.
1,049,046.
Patented Dec. 31, 1912.
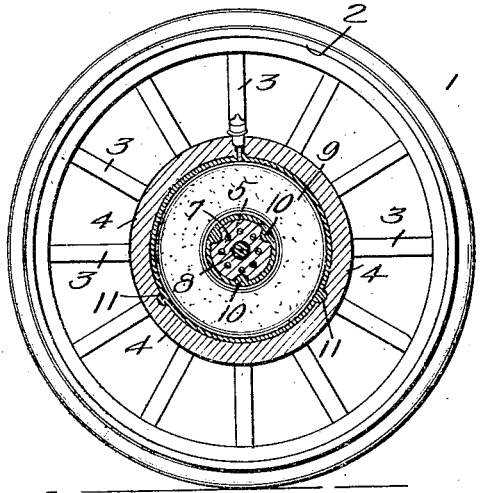
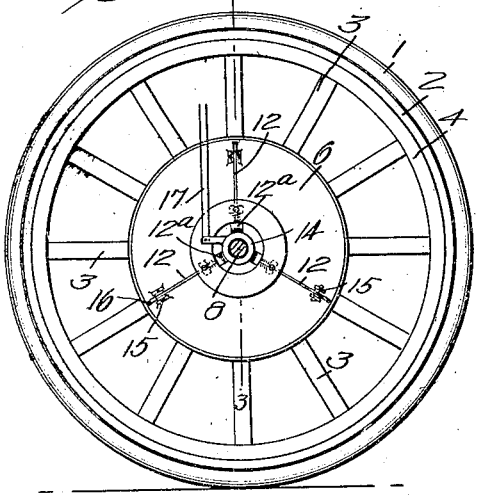
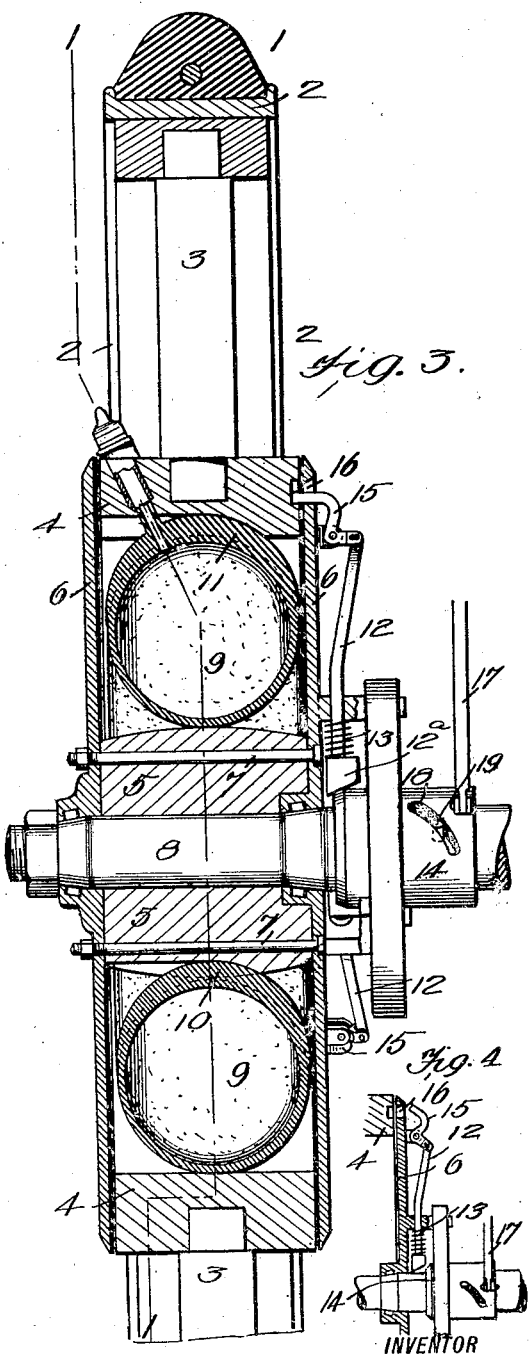
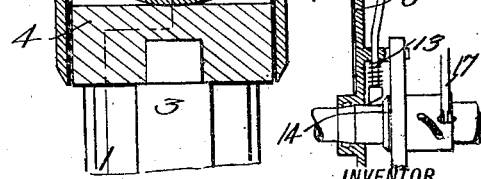
WITNESSES
INVENTOR
Samuel W. Buercklin
BY Munn & Co.
ATTORNEYS

UNITED STATES PATENT OFFICE.

SAMUEL W. BUERCKLIN, OF PRAGUE, OKLAHOMA.

SPRING-CUSHIONED WHEEL.

1,049,046.  Specification of Letters Patent.  Patented Dec. 31, 1912.

Application filed December 7, 1911. Serial No. 664,312.

*To all whom it may concern:*

Be it known that I, SAMUEL W. BUERCKLIN, a citizen of the United States, and a resident of Prague, in the county of Lincoln and State of Oklahoma, have invented an Improvement in Spring-Cushioned Wheels, of which the following is a specification.

My invention is an improved substitute for the pneumatic-tired wheels commonly used on automobiles, autocycles, and other motor-propelled vehicles.

It is more particularly an improvement in that class of spring wheels in which a pneumatic outer tire is disposed with and an elastic central or hub portion is substituted to provide the required resiliency for the wheel as a whole.

In carrying out my invention, I preferably employ an air-filled cushion which surrounds the hub and upon which the inner rim of the surrounding annular body of the wheel presses with more or less force, according to the weight and load on the vehicle. It will be understood, however, that I do not in all cases intend to limit myself to such cushion, but may employ any suitable substitute.

The invention is hereinafter described with reference to the accompanying drawings, in which—

Figure 1 is a face view of a portion of my improved wheel with the central or hub portion in section. Fig. 2 is an inner face view of the wheel. Fig. 3 is an enlarged transverse section on the line 3—3 of Fig. 2. Fig. 4 is a detail view illustrating the operation of a clutch forming part of my invention.

The numeral 1 indicates a solid rubber tire, 2 a flanged metal rim on which it is secured, 3 radial spokes, and 4 an inner wooden or metal rim in which the spokes are seated. These parts, 1, 2, 3, and 4, constitute the outer annular portion of the wheel surrounding what may be termed the hub portion. Said hub portion is formed of a wooden or metal hub proper 5 and parallel metal plates 6 extending radially at the ends of the section 5, these parts being rigidly connected by traverse screw-rods 7. The hub portion thus formed is adapted to revolve around the axle 8.

Between the hub proper 5 and the inner wooden or metal rim 4 of the annular portion of the wheel there is arranged a ring-shaped rubber cushion 9, the same bearing directly on the hub and its peripheral portion outward against the inner rim 4. The hub section 5 is preferably slightly convex.

It will be seen that the weight of the vehicle body and its load is imposed on the cushion 9, since the annular portion of the wheel composed of parts 1, 2, 3, 4, is adapted to move radially with reference to the hub proper 5, so that the inner rim 4 slides between the hub plates 6. Thus, a sufficient degree of resiliency is provided for the wheel by the interposition of the ring-shaped cushion 9 between the hub and the surrounding annular portion of the wheel, thus rendering the use of a pneumatic tire unnecessary.

In order to prevent the circumferential movement of the cushion 9 around the hub proper and the like movement of the outer annular portion of the wheel upon the cushion, I provide means for locking them together, the same being illustrated in Fig. 1, in which the cushion 9 is shown provided on its inner side with transverse ribs or interior projections 10 which enter corresponding cavities in the hub section 5, and the outer side of the cushion is provided with similar ribs or projections 11 which enter corresponding grooves or cavities in the inner side of the surrounding wooden or metal rim 4. I likewise provide a means for clutching or locking the outer annular portion of the wheel to the hub portion, the same being illustrated in Figs. 2, 3, 4. As shown best in Fig. 3, slightly bent rods 12 are adapted to slide in lugs projecting laterally from the inner hub plate 6, the inner enlarged end or head 12ª of said rod being located adjacent to the axle. Spiral springs 13 are interposed between such heads and the aforesaid lugs. The beveled surface of the rod heads 12ª is adapted for frictional contact with a sleeve 14 which has a rotary and rectilinear movement on the axle 8.

The outer ends of the rods 12 are pivoted to clutches 15 which have the form, substantially, of an elbow-lever, their free ends being adapted to project through holes 16 in the hub plate and to enter sockets in the inner wheel rim 4. A lever 17 is pivotally connected with the sleeve 14, so as to rotate the latter in the arc of a circle, and the sleeve is provided with a diagonal slot 18 which receives a pin 19 that is fixed in the axle.

When the sleeve is in the retracted position shown in Fig. 4, the expansion of the springs 13 holds the rods 12 in such position that the clutches 15 are out of engagement with the annular portion of the wheel; but, upon operating the lever 17, the sleeve 14 is rotated and at the same time forced inward by the coaction of the pin 19 with the diagonal slot 18, so that the beveled inner end of the sleeve is carried into engagement with the enlarged heads $12^a$ of the rods 12, whereby the latter are forced radially outward, thereby throwing the clutches 15 inward and into engagement with the inner wheel rim 4. By this simple means, which is manually controlled, the outer portion of the wheel may be locked with the hub, and this means may be availed of when starting the machine or when climbing or descending a hill.

What I claim is:—

1. The combination of the annular outer portion of the wheel including an inner rim provided with lateral sockets, and a hub portion including a hub proper and annular parallel plates extended radially on the sides of the inner rim, and a cushion interposed between the hub and outer annular portion, a clutch including a device adapted to engage the inner rim and lock the same with the adjacent hub plate, a slidable spring-retracted rod connected with said device, and means on the axle adapted for adjustment into and out of engagement with the adjacent inner end of said rod, and a device for effecting such adjustment manually, whereby the clutch may be thrown into and out of engagement with the annular portion of the wheel, substantially as described.

2. The combination of the annular outer portion of the wheel including an inner rim provided with lateral sockets, and a hub portion including a hub proper and annular parallel plates extended radially on the sides of the inner rim, and a cushion interposed between the hub and outer annular portion, a clutch including a device adapted to engage the inner rim and lock the same with the adjacent hub plate, a slidable spring-retracted rod connected with said device, the inner end of the rod being beveled as shown, a sleeve on the axle which is adapted for rotary and longitudinal movement, and provided with a diagonal slot, a pin on the axle working in said slot, and a hand lever connected with the sleeve, whereby it may be adjusted to bring its inner end into or out of engagement with the head of the rod, substantially as described.

SAMUEL W. BUERCKLIN.

Witnesses:
J. W. REYNOLDS,
B. JELKS.